United States Patent
Whitaker et al.

(10) Patent No.: US 11,256,259 B2
(45) Date of Patent: Feb. 22, 2022

(54) ZONE ENGINE FOR PROVIDING CONTEXT-AUGMENTED MAP LAYER

(71) Applicant: Locus Robotics Corp., Wilmington, MA (US)

(72) Inventors: Matthew Whitaker, San Diego, CA (US); Bradley Powers, Lowell, MA (US); Michael Charles Johnson, Ashland, MA (US); Sean Johnson, Danvers, MA (US); Thomas Moore, Edinburgh (GB)

(73) Assignee: Locus Robotics Corp., Wilmington, MA (US)

( * ) Notice: Subject to any disclaimer, the term of this patent is extended or adjusted under 35 U.S.C. 154(b) by 245 days.

(21) Appl. No.: 16/135,329

(22) Filed: Sep. 19, 2018

(65) Prior Publication Data

US 2020/0089237 A1  Mar. 19, 2020

(51) Int. Cl.
G01C 21/20 (2006.01)
G05D 1/00 (2006.01)
G05D 1/02 (2020.01)
G06Q 10/08 (2012.01)

(52) U.S. Cl.
CPC ......... *G05D 1/0214* (2013.01); *G01C 21/206* (2013.01); *G05D 1/0088* (2013.01); *G05D 1/0291* (2013.01)

(58) Field of Classification Search
CPC .. G01C 21/206; G01C 21/00; G01C 21/3635; G01C 21/367; G01C 21/3682; G05D 1/0214; G05D 1/0088; G05D 1/0291; G05D 2201/0216; G05D 1/0234; G05D 1/0297; G05D 1/0274; G06Q 10/08; G06Q 10/101; G06Q 10/103; G06Q 30/02; G06Q 40/00; G06Q 50/01; G06F 16/27; G06F 16/9535; G01S 19/24; H04L 41/0609; H04L 43/10; G16H 40/67; Y02P 90/90
USPC .......................................... 701/27
See application file for complete search history.

(56) References Cited

U.S. PATENT DOCUMENTS

| | | | |
|---|---|---|---|
| 8,892,241 | B2 | 11/2014 | Weiss |
| 9,463,927 | B1 | 10/2016 | Theobald |
| 2005/0238465 | A1 | 10/2005 | Razumov |
| 2010/0296908 | A1 | 11/2010 | Ko |
| 2011/0200420 | A1 | 8/2011 | Driskill |
| 2013/0317642 | A1 | 11/2013 | Asaria et al. |
| 2014/0100693 | A1 | 4/2014 | Fong |

(Continued)

FOREIGN PATENT DOCUMENTS

| | | | |
|---|---|---|---|
| EP | 1898289 A2 * | 3/2008 | ........... G05D 1/0265 |
| EP | 1898289 A2 | 3/2008 | |

OTHER PUBLICATIONS

International Search Report and Written Opinion, dated Nov. 21, 2019, received in international patent application No. PCT/US19/051826, 10 pages.

*Primary Examiner* — Abby Y Lin
*Assistant Examiner* — Hossam M Abd El Latif
(74) *Attorney, Agent, or Firm* — Sunstein LLP

(57) ABSTRACT

Systems and methods for contextually mapping zones within a space for regulating robotic navigation within the space include defining, by at least one fiducial marker positioned within the space, a zone within the space, associating a rule with the zone, the rule at least partially dictating operation of one or more robots within the zone, and operating the one or more robots within the zone consistent with the rule.

20 Claims, 13 Drawing Sheets

(56) References Cited

U.S. PATENT DOCUMENTS

| | | | |
|---|---|---|---|
| 2014/0277691 A1* | 9/2014 | Jacobus | B66F 9/063 |
| | | | 700/216 |
| 2016/0282126 A1* | 9/2016 | Watts | H04W 4/029 |
| 2017/0029213 A1* | 2/2017 | Johnson | G05D 1/0274 |
| 2018/0225835 A1* | 8/2018 | Harada | G01C 21/32 |

\* cited by examiner

300

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

FIG. 6

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

| Zone ID | Boundary Point ID | Open/Closed | Class | Max Speed | Max Occupancy | Traffic Flow | Stop&Wait | Don Update | Expiration |
|---|---|---|---|---|---|---|---|---|---|
| 901 | 902a, 902b, 902c | Open | aisle | none | | | | N | |
| 903 | 904a, 904b, 904c | Open | aisle | 50% | 15 | Enter 904a, Exit 904b | Stop at 904b, Go after clear traffic scan | N | |
| 905 | 906a, 906b, 906c | Open | dock | 25% | 1 | | Stop on entry to confirm dock is clear | N | |
| 907 | 908a, 908b, 908c | Closed, Occupied, no go | | | 0 | | | N | 24 hours |

FIG. 10

ZONE ENGINE FOR PROVIDING CONTEXT-AUGMENTED MAP LAYER

FIELD OF THE INVENTION

This invention relates to regulating robot navigation and more particularly to a zone engine for providing a context-augmented map layer for regulating robot navigation.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

To the extent that the robots concurrently navigate a warehouse space alongside both human operators and other robots, in spaces of varying size and traffic load, collision risk can increase or decrease depending on instant robot location. For example, during an order fulfillment operation, a robot may navigate between large, low-traffic spaces where collision risk is minimal and narrow, high-traffic spaces where collision risk is high. Additionally, to the extent that construction, maintenance, non-navigable obstacles, displaced products, pallets, bins, or shelves, or other such temporary or permanent impediments are introduced to the warehouse environment, robot navigation may be impacted.

BRIEF SUMMARY OF THE INVENTION

Provided herein are systems and methods for a zone engine for providing a context-augmented map layer for regulating robot navigation.

In one aspect, a method for contextually mapping zones within a space for regulating robotic navigation within the space is provided. The method includes defining, by at least one fiducial marker positioned within the space, a zone within the space. The method also includes associating a rule with the zone, the rule at least partially dictating operation of one or more robots within the zone. The method also includes operating the one or more robots within the zone consistent with the rule.

In some embodiments, the rule dictates at least one of whether the zone is open or closed, a type of the zone, a maximum occupancy of the zone, a maximum speed of the zone, a traffic flow directionality of the zone, a stop and wait behavior when entering or exiting the zone, whether a definition of the zone has been dynamically updated, an expiration of the zone, or combinations thereof. In some embodiments, the step of associating further comprises generating a lookup table correlating the zone with the at least one fiducial marker and the rule. In some embodiments, the method also includes associating one or more additional rules with the zone, the additional rules at least partially dictating operation of one or more robots within the zone. In some embodiments, the method also includes operating the one or more robots within the zone consistent with the additional rules. In some embodiments, the additional rules dictate at least one of whether the zone is open or closed, a type of the zone, a maximum occupancy of the zone, a maximum speed of the zone, a traffic flow directionality of the zone, a stop and wait behavior when entering or exiting the zone, whether a definition of the zone has been dynamically updated, an expiration of the zone, or combinations thereof.

In some embodiments, the step of associating one or more additional rules further comprises generating a lookup table correlating the zone with the at least one fiducial marker, the rule, and the additional rules. In some embodiments, the method also includes detecting at least one of overlap or adjacency of the zone with respect to a second zone. In some embodiments, the method also includes identifying a conflict between a value of the rule and a corresponding value of a corresponding rule of the second zone. In some embodiments, the method also includes generating a conflict-resolved rule for association with an overlap zone defined by one or more shared fiducial markers common to the zone and the second zone. In some embodiments, the step of generating the conflict-resolved rule also includes selecting the higher or the lower of the value and the corresponding value. In some embodiments, step of generating the conflict-resolved rule also includes defining a target value between the value and the corresponding value. In some embodiments, the step of generating the conflict-resolved rule also includes associating the target value with an accompanying value tolerance such that the accompanying value tolerance encompasses both the value and the corresponding value.

In some embodiments, the method also includes automatically redefining the zone within the space in response to a detected repositioning and/or reorientation of the at least one fiducial marker. In some embodiments, the method also includes at least one of automatically modifying the rule or automatically adding an additional rule in response to data received from one or more of the robots, a warehouse management system, a user, or an external data source. In some embodiments, a position of the at least one fiducial marker within the space is represented by a set of coordinates of a coordinate system defined by the space. In some embodiments, the at least one fiducial marker within the space is correlated with a pose having a relative position to the fiducial marker, the relative position represented by a set of coordinates of a coordinate system defined by the space. In some embodiments, a boundary of the zone is at least partially defined by the pose.

In some embodiments, the step of operating further comprises periodically reporting, from the one or more robots to a central controller, a position of the one or more robots within the space. In some embodiments, the step of operating further comprises instructing, by the central controller, in response to reported positioning of the one or more robots within the zone, the one or more robots to operate as dictated by the rule. In some embodiments, the position of the one or more robots within the space is not determined by reading the at least one fiducial marker. In some embodiments, the step of operating further comprises periodically detecting, by each respective one of the one or more robots, a position of the robot within the space. In some embodiments, the step of operating further comprises operating, in response to detecting positioning of the robot within the zone, the robot as dictated by the rule. In some embodiments, the position of the one or more robots within the space is not determined by reading the at least one fiducial marker.

In another aspect, a system for contextually mapping zones within a space for regulating robotic navigation within the space is provided. The system includes a processor. The system also includes a memory storing instructions that, when executed by the processor, cause the system to define, by at least one fiducial marker positioned within the space, a zone within the space, associate a rule with the zone, the rule at least partially dictating operation of one or more robots within the zone, and operate the one or more robots within the zone consistent with the rule.

In some embodiments, the memory further storing instructions that, when executed by the processor, cause the system to generate, in the memory, a lookup table correlating the zone with the at least one fiducial marker and the rule. In some embodiments, the memory further storing instructions that, when executed by the processor, cause the system to associate one or more additional rules with the zone, the additional rules at least partially dictating operation of one or more robots within the zone, and operate the one or more robots within the zone consistent with the additional rules. In some embodiments, the memory further storing instructions that, when executed by the processor, cause the system to generate, in the memory, a lookup table correlating the zone with the at least one fiducial marker, the rule, and the additional rules. In some embodiments, the memory further storing instructions that, when executed by the processor, cause the system to automatically redefine the zone within the space in response to a detected repositioning and/or reorientation of the at least one fiducial marker. In some embodiments, the memory further storing instructions that, when executed by the processor, cause the system to at least one of automatically modify the rule or automatically add an additional rule in response to data received from one or more of the robots, a warehouse management system, a user, or an external data source. In some embodiments, a position of the one or more robots within the space is not determined by reading the at least one fiducial marker. In one aspect the invention features a method for.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

FIG. 10 is a table of zone ID to fiducial ID mapping with corresponding zone properties;

DETAILED DESCRIPTION OF INVENTION

Figure 1:
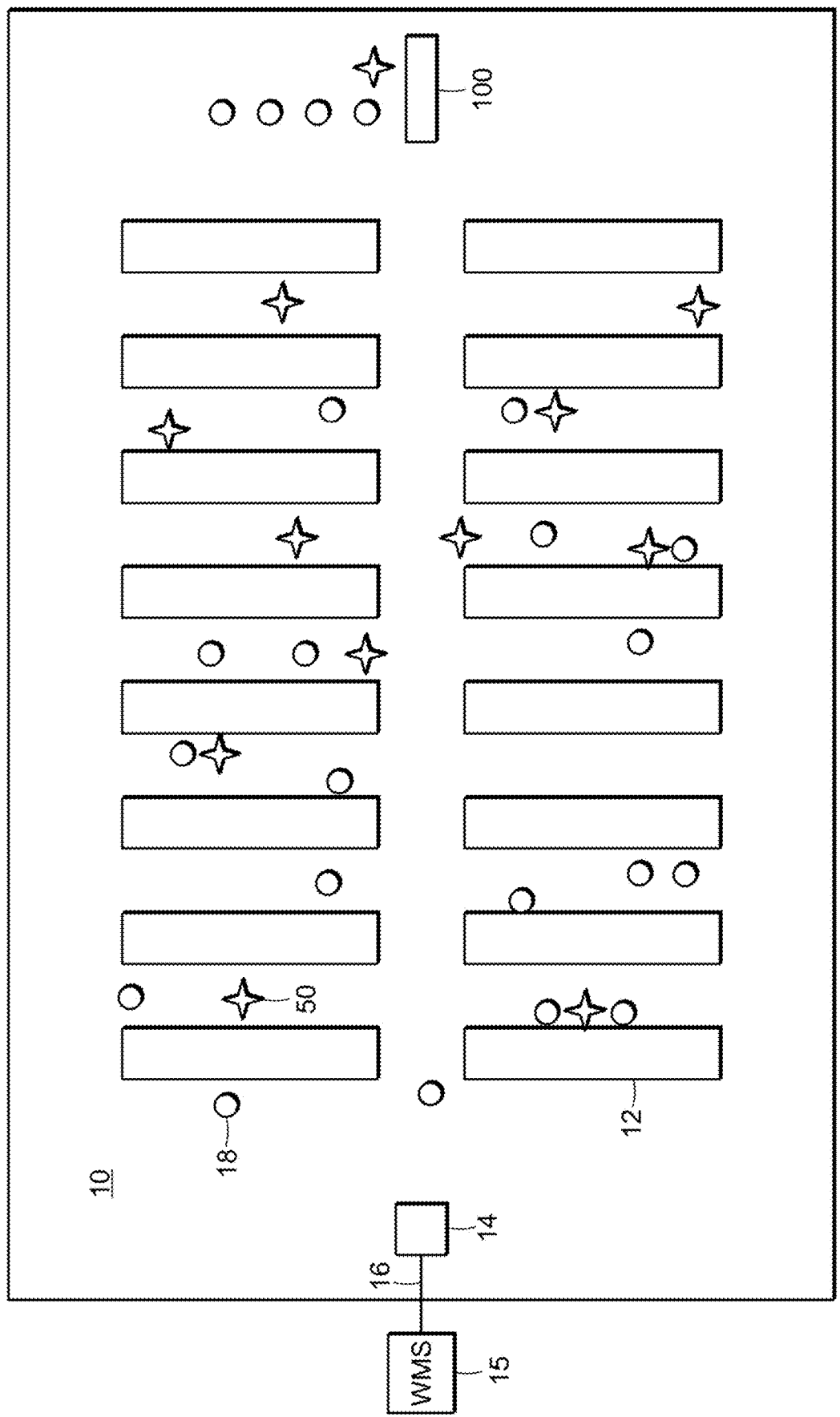
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to a zone engine for providing a context-augmented map layer for regulating robot navigation. Although not restricted to any particular robot application, one suitable application that the invention may be used in is order fulfillment. The use of robots in this application will be described to provide context for the zone engine but is not limited to that application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2A:
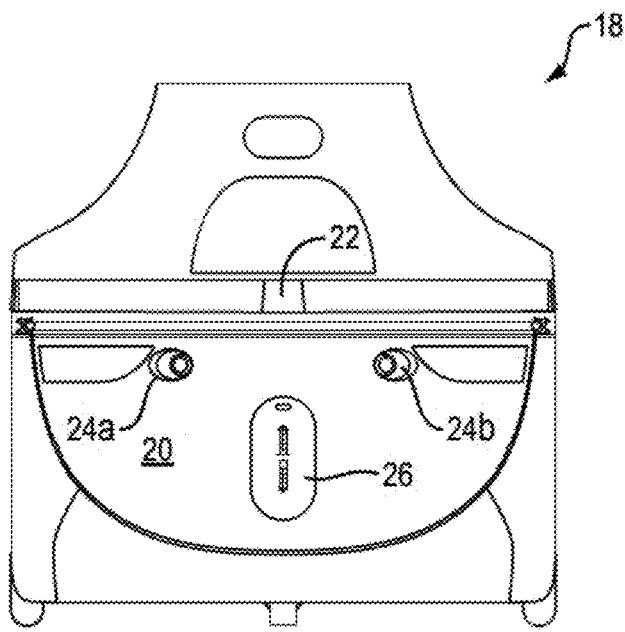
FIG. 2A is a front elevational view of a base of one of the robots used in the warehouse shown in FIG. 1.
Figure 2B:
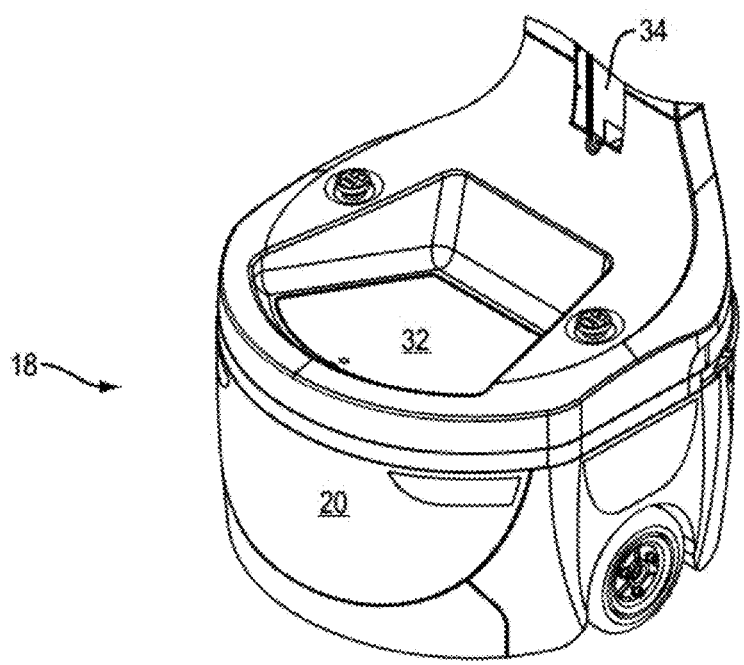
FIG. 2B is a perspective view of a base of one of the robots used in the warehouse shown in FIG. 1.
Figure 3:
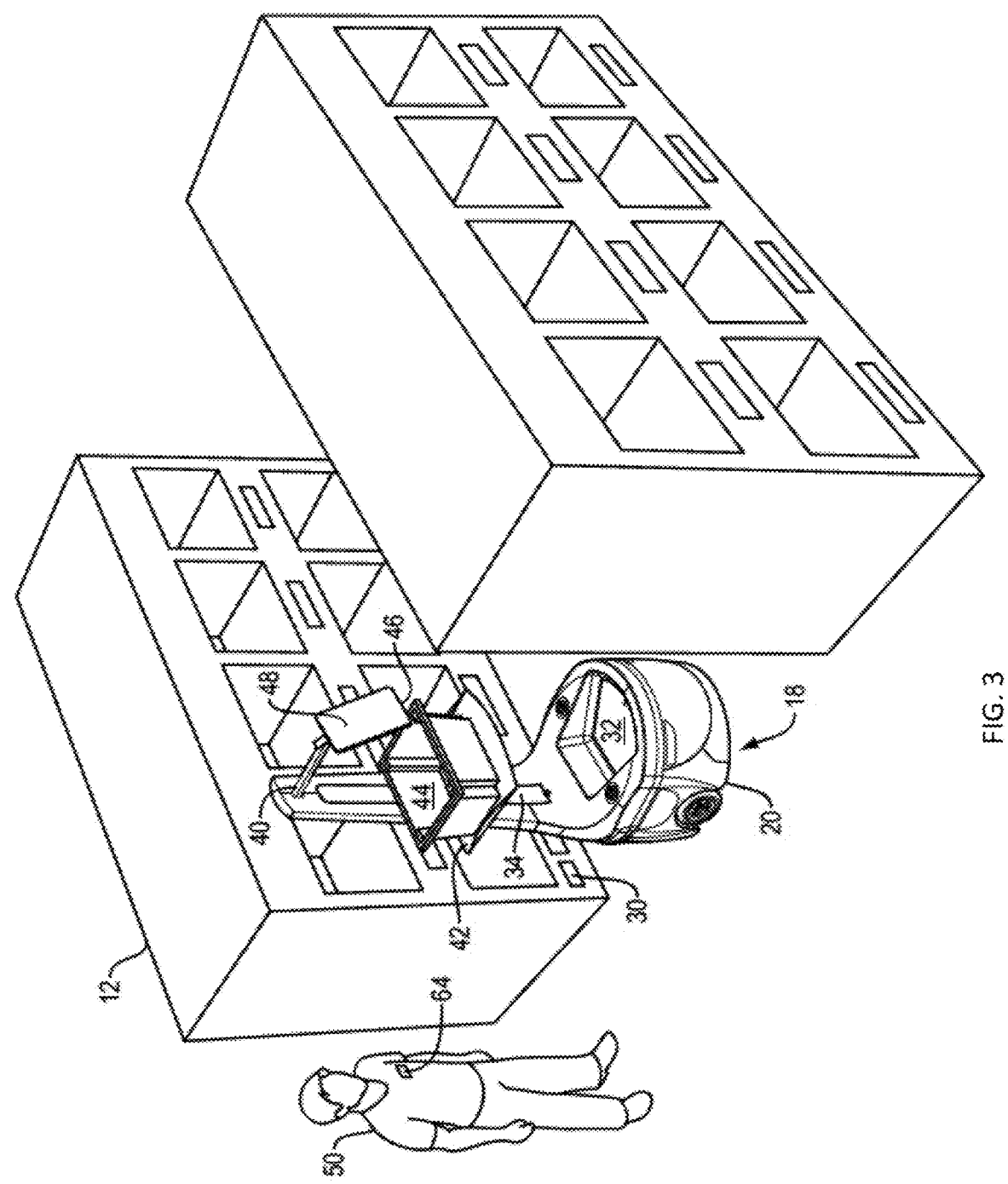
FIG. 3 is a perspective view of the robot in FIGS. 2A and 2B outfitted with an armature and parked in front of a shelf shown in FIG. 1.
Figure 4:
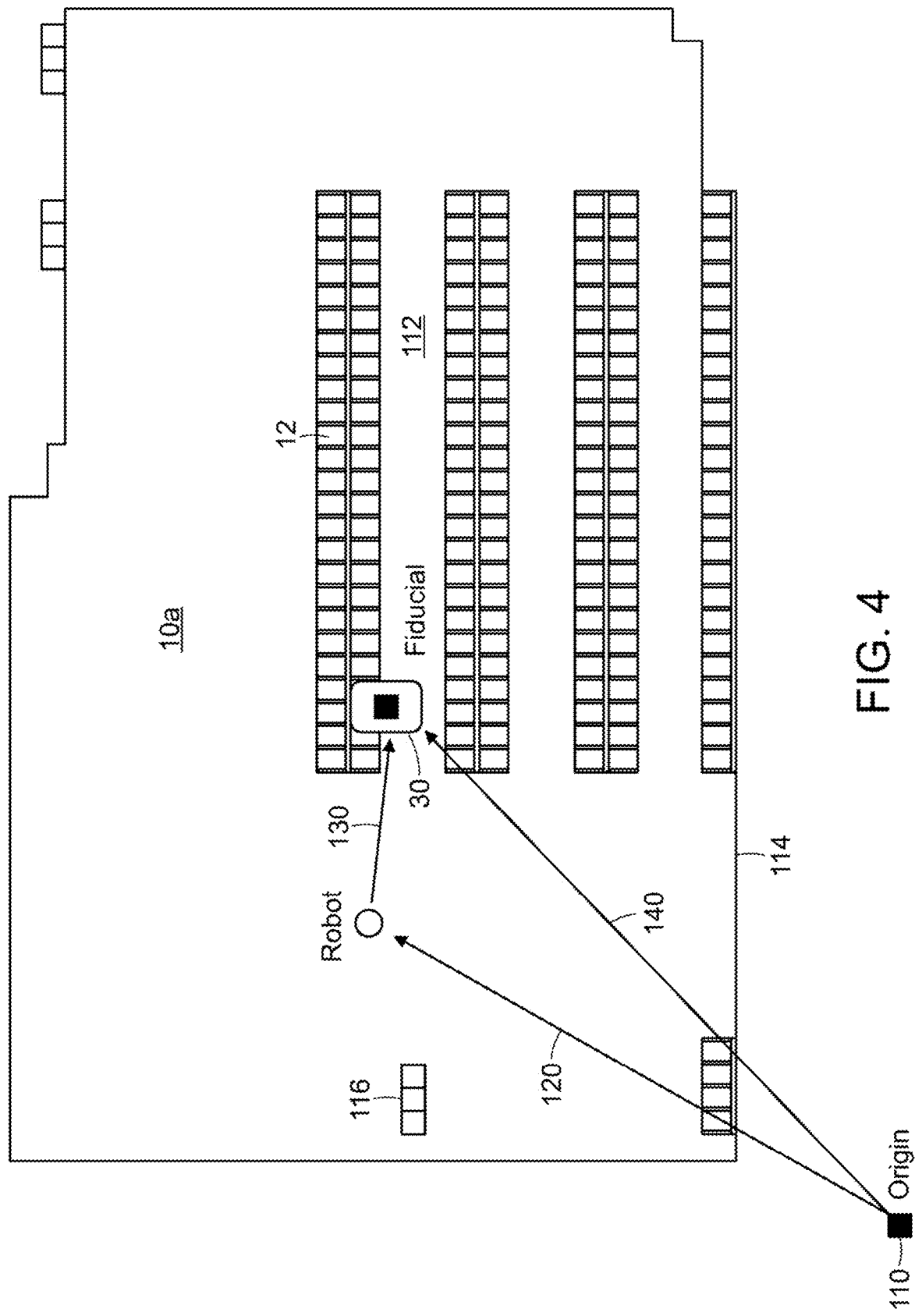
FIG. 4 is a partial map of the warehouse of FIG. 1 created using laser radar on the robot.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS.

3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
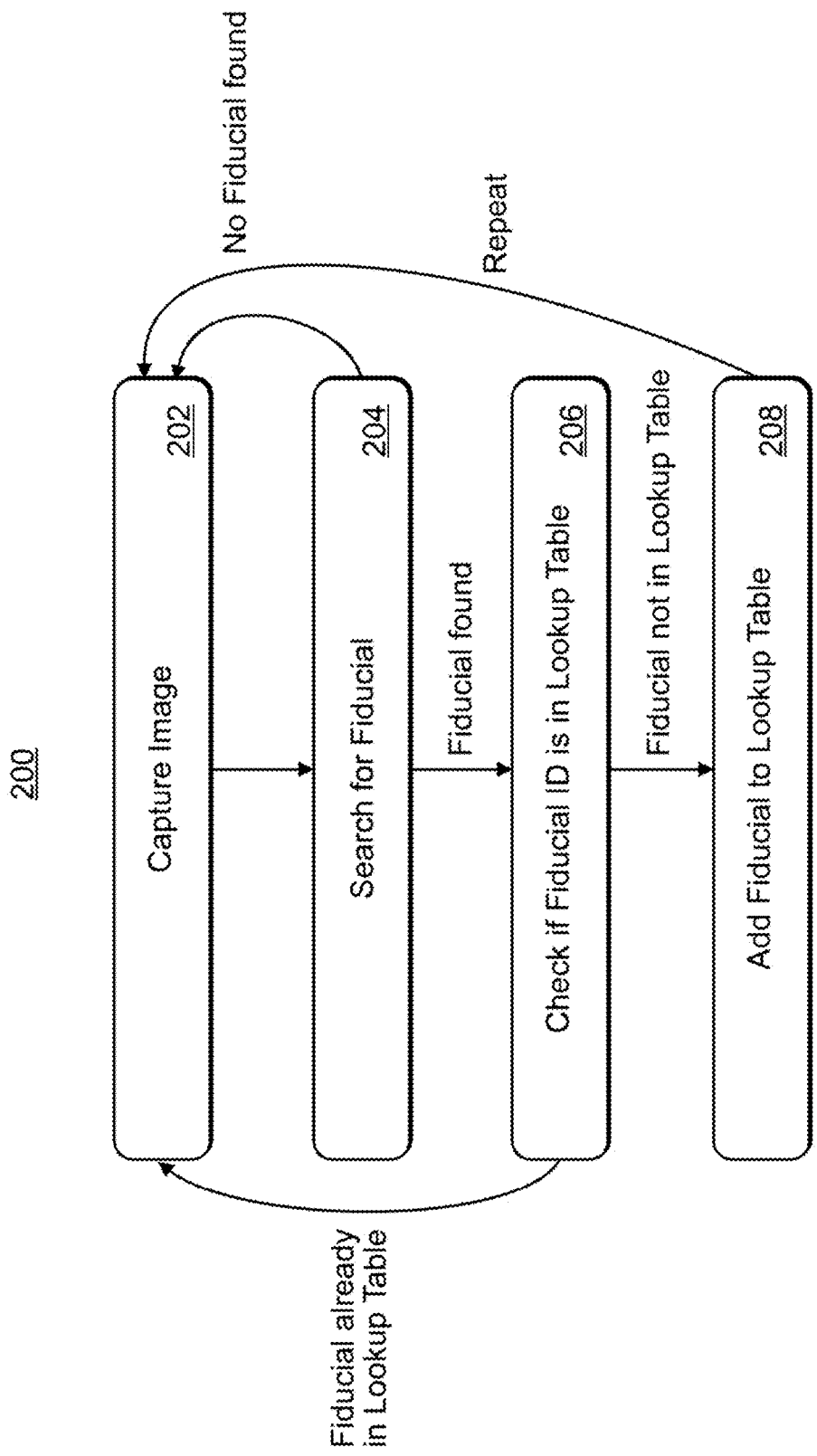
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
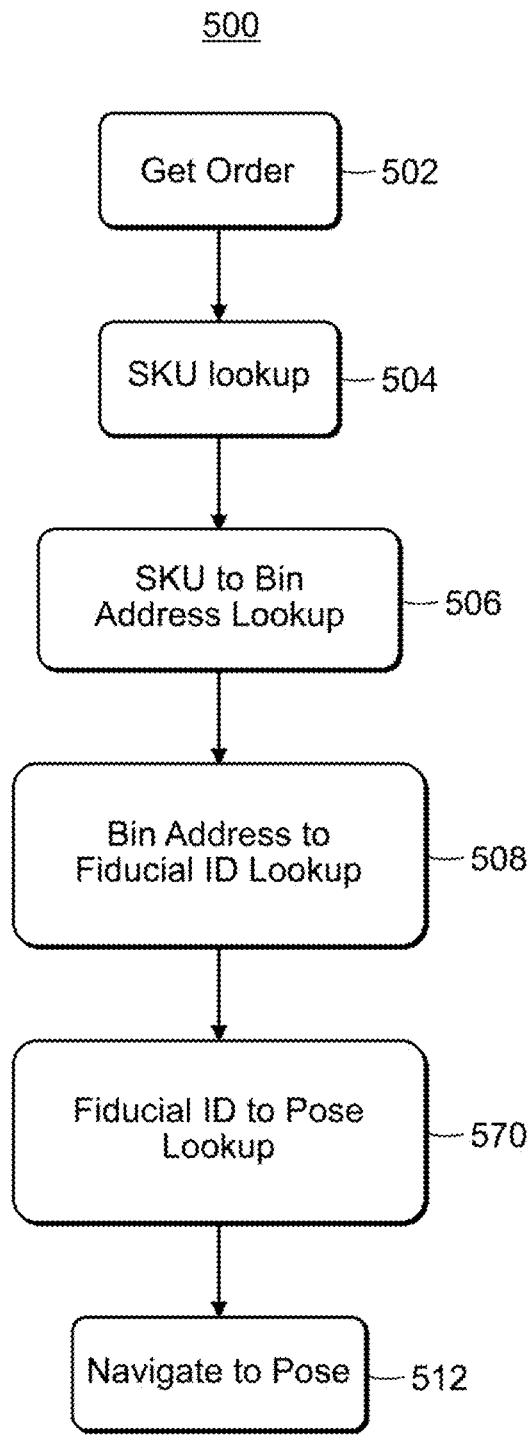
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

As described above, a problem that can arise with multiple robots navigating varying zones within a space alongside people, equipment, and other obstacles can present a risk of collisions and/or traffic jams. Dynamic, zone-based regulation of robot navigation can be effected by a context-augmented map layer provided by a zone engine. The zone engine, in some embodiments, can be a module of the warehouse management system 15 or the order-server 14 or, in some embodiments, can be implemented in a standalone zone server or system. The zone engine is used to provide a context-augmented map layer (CAML) corresponding to the SLAM map and stored within the memory of the robot 18 for use in traversing a navigational space. The CAML can include a plurality of dynamically definable zones, each associated with one or more navigational rules for observation by any robots within the respective zone. At the highest level, as described with greater detail below, the navigational rules can be defined in two categories: 1) "open" or navigable zones that robots 18 are permitted to enter and traverse and 2) "closed" or "nogo" zones which robots 18 are not permitted to traverse or enter. Other regulations, and constraints corresponding to each zone can include, for example, speed limits, speed minimums, limitations on travel direction, maximum occupancy restrictions, stop and wait requirements, or any other regulation or limitation on robot navigation and travel within a navigational space (e.g., warehouse 10). Additionally, zones can be provided with either a custom configured set of regulations/limitations or zones can be assigned to one or more preconfigured categories such as, for example, nogo zones, aisle zones, one-way zones, docking zones, queuing zones, pose zones, or any other suitable preconfigured category. Furthermore, zones can be permanent (e.g., the zone will remain established until the user deletes it from the CAML) or temporary (e.g., the zone will expire after a predetermined time or upon repositioning or removal of one or more fiducials or objects from a specified area).

More generally, the purpose of the CAML is to add a flexible layer of meta-information to the navigational (SLAM) maps used by the robots 18 described above. By incorporating such dynamic, zone-based navigation regulation, the robots 18 are able to operate appropriately based on the context of their location. In some embodiments, this is achieved because the CAML effectively "marks-up" the map with zones or regions associated with properties influencing behavior of the robot within defined boundaries of the zone.

In general, the zone boundary to enclose the boundary points can be calculated by combining the positions of each boundary point and any buffer zone associated therewith (e.g., a spacing between the fiducial marker and the pose associated therewith). Inflation, deflation, or skewing properties can then be applied to the calculated boundary geometry as required. In some embodiments, where the fiducial markers are already situated on a site 'occupancy grid' (SLAM) map, the area surrounding the fiducial marker can be analyzed to determine a directionality of an area 'in-front' of the fiducial (i.e. from where the fiducial is visible) and the area behind the fiducial, which is usually some solid and impassable obstacle such as a shelf or bin. In some embodiments, for simplicity and to facilitate automation in defining zones, when a set of fiducials is used to provide the boundary points defining a zone, if boundary point fiducials are 'facing' each other the boundary can drawn to enclose the space between fiducials, thus capturing the clear-space 'aisle' as the defined zone. When boundary point fiducials are facing away from each other, the boundary can instead enclose the physical structures the fiducials are mounted upon (e.g., shelves, bins, etc.) as a defined nogo zone. In some embodiments, more complex boundaries can be generated where the orientations of the fiducials and the presence of physical structures in their individual zones requires a more complex geometry. For example, in some embodiments, a zone spanning multiple aisles can be automatically decomposed into relevant clear and occupied space zones. In some embodiments, such decomposition can be performed internally to the robotic system and thus transparently to the user or programmer responsible for defining the zones.

In general, the zone engine system can provide the context-augmented map layer using a zone definition that, although ultimately mapped into a Cartesian frame of reference on a larger grid map, is defined at a higher level based on the positioning of boundary point fiducial markers. Advantageously, by providing such higher level zone definition, in some embodiments, the zone boundary can be automatically recalculated as required. Thus, if, on subsequent maps or map updates, the fiducial boundary point positions have changed, then it is possible to automatically relocate zones and alter their dimensions without any user involvement. This may range from a minor change to the boundary, to a complete repositioning of the boundary within the space, if, for example, the fiducial(s) have been moved to an adjacent aisle. In particular, such an arrangement allows for automatic restructuring and modification of zones without requiring human interaction beyond defining the zones according to the boundary point fiducial markers. This allows for a much more flexible and dynamic system than would be the case of zones were defined at the user level in a Cartesian frame of reference.

It will be apparent in view of this disclosure that, in some embodiments, a zone can be at least partially defined using fixed Cartesian coordinates based upon an origin for a specific site map. However, such an approach is less flexible than using boundary point fiducial markers and is only advisable if no fiducial markers are available and/or if the zone is strongly tied to the physical infrastructure of the site and is thus not expected to move over time.

Figure 9:
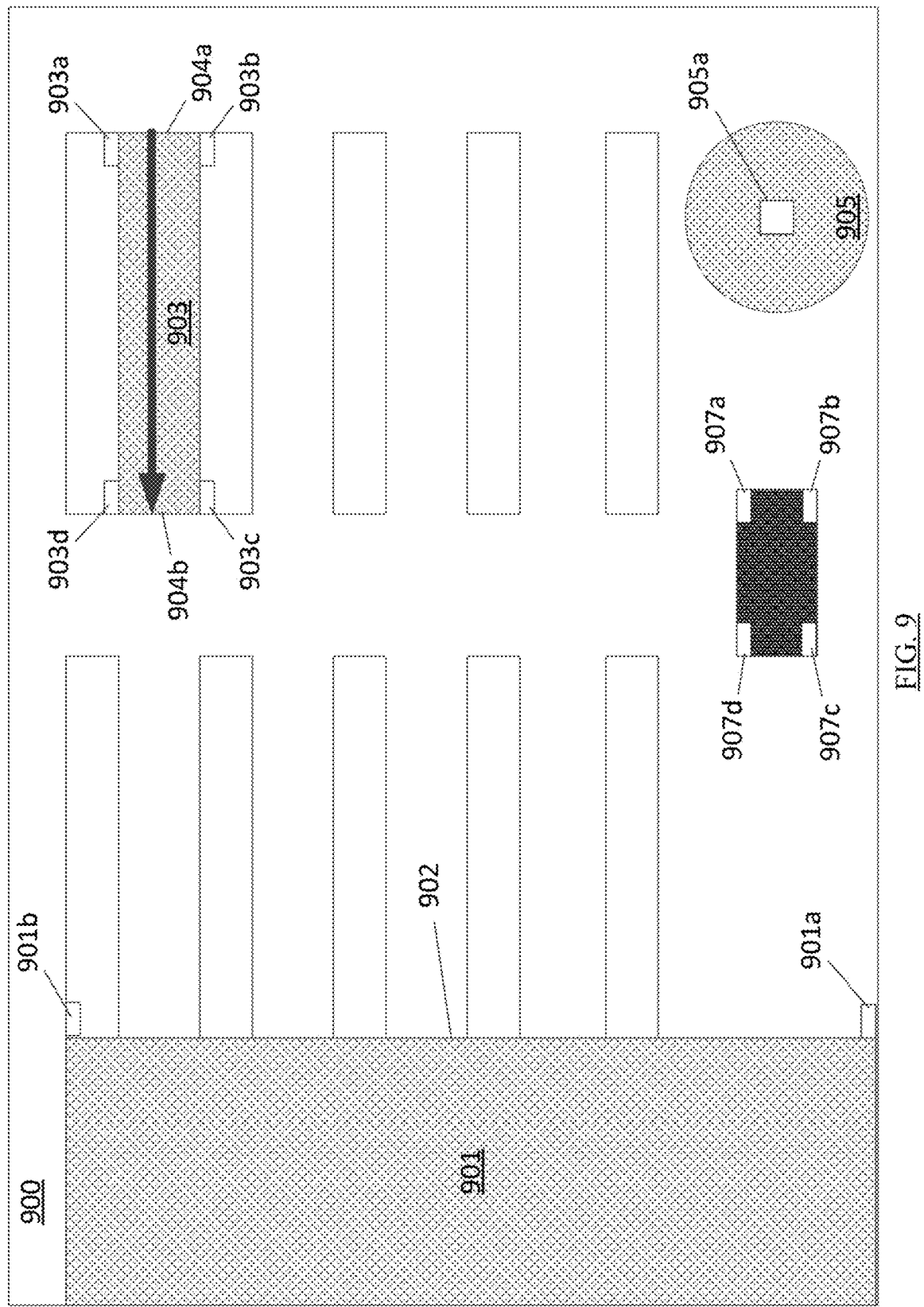
FIG. 9 is a top plan view of an order-fulfillment warehouse having a plurality of zones.

FIG. 9 illustrates a sample navigational space 900 (e.g., warehouse 10) having one or more zones 901, 903, 905, 907. Each zone can be defined by one or more boundary points 901a-b, 903a-d, 905a, and 907a-d, each boundary point corresponding to one of the fiducial markers 30 within the navigational space 900. In particular, each zone 901, 903, 905, 907 can be defined by a set of 0 to n boundary points 901a-b, 903a-d, 905a, and 907a-d.

The boundary points 901a-b, 903a-d, 905a, and 907a-d each correspond to a fiducial marker 30 and/or correlated pose location present within the warehouse, thereby at least partially defining the geometry of the zone. In particular, as described above, each fiducial marker 30 can be correlated with a pose, which can include a position and orientation within the navigational space 900 relative to the fiducial marker 30 associated with the pose. Further as described above, the correlation between the fiducial marker 30 and the pose aids in navigation of the robot 18 through the navigational space 900 and facilitates picking, charging, or other robot 18 activity. Therefore, corresponding each of the boundary points 901a-b, 903a-d, 905a, and 907a-d with a fiducial marker 30 and/or a pose advantageously, as discussed above, provides for automatic, dynamic, flexible reconfiguration of the zones in response to, for example, movement of the fiducial marker 30 and/or pose. Furthermore, because the boundary points 901a-b, 903a-d, 905a, and 907a-d and the poses are correlated to the fiducial markers 30, all three location and orientation data sets are already described and built into the navigational system and will dynamically update relative to one another. Thus, any change (e.g., repositioning of a fiducial marker 30) can automatically push the update throughout the system, rather than requiring an inefficient, error prone process of updating all three data sets (fiducial marker, pose, and boundary point) separately.

Once the zone boundary points 901a-b, 903a-d, 905a, and 907a-d are determined, the final zone geometry can then be influenced by imparting geometric constraints with respect to those boundary points 901a-b, 903a-d, 905a, and 907a-d. In general, the zone geometry can be determined in any suitable way. For example, the zone can extend in one or more directions from an edge formed by two or more boundary points, can extend outward to surround a single boundary point to define a circular or polygonal zone, can form a zone within a perimeter defined by three or more boundary points, and/or can extend outward from at least a portion of a perimeter defined by three or more boundary points. In each case, further definition can be provided such as, for example, a distance which the zone extends from a point or edge, a shape (e.g., circular or polygonal) of a particular zone, and/or a shape of one or more edges (e.g., convex, concave, straight).

For example, as shown in FIG. 9, a freeway zone 901 extends from an edge 902 formed between boundary points 901a-b toward a wall (or other permanent structure) of the warehouse 10. As shown in FIG. 9, the freeway zone 901 is established along a relatively wide roadway exterior to actual picking and storage shelves 12. Because there is ample space and likely less human and robot traffic in the freeway zone 901, it may be reasonable for robots 18 within the freeway zone 901 to engage in two-way travel while operating at full speed.

As further shown in FIG. 9, in some embodiments, a one-way zone 903 can be provided. As shown in FIG. 9, the one-way zone can, for example, be interior to a perimeter defined by corner boundary points (e.g., as in zone 903 formed between boundary points 903a-d). The one-way zone 903 can, for example, be a relatively narrow and/or higher traffic area such as a narrow aisle between two closely positioned shelves 12 wherein two way robot traffic is infeasible without excessive risk of collision. Thus, as shown in FIG. 9, the one-way zone 903 can be constrained in the CAML such that robots 18 can only traverse the zone by entering at a first edge 904a extending between boundary points 903a and 903b and exiting at a second edge 904b extending between boundary points 903c and 903d. Additionally, for example, a narrow, crowded zone such as one-way zone 903 may further impose reduced speed limits to provide additional time for human pickers and robots 18 alike to engage in collision avoidance activities such as swerving or stopping. In some embodiments, one-way zone 903 can include a maximum occupancy restriction to alleviate crowding within the zone 903.

Also shown in FIG. 9, a charging zone 905 can specify a predetermined radius extending from a single boundary point 905a to form a circular zone shape surrounding one or more charging stations. Alternatively, in some embodiments, the zone shape can be dictated as any suitable shape surrounding the boundary point 905a such as, for example, a rectangle, a square, any other polygon, an ellipse, or any other suitable shape, or combinations thereof. Because robots 18 need to be periodically recharged, a bank of charging stations can typically experience high robot traffic. Thus, the charging zone 905 may include a relatively low speed limit. Furthermore, as described above, in some embodiments, as a robot 18 approaches a charging station, a more precise navigation approach may be activated to provide for the finer positional adjustments required to dock the robot with the charging station. For example, in some embodiments, within the charging zone 905, a more granular local coordinate system can be provided such that local (x,y,z, ω) coordinates used for high precision maneuvers (e.g., docking between the robot 18 and a charging station) provide for finer positional adjustment of the robot 18 than is used for ordinary navigation.

An obstacle avoidance zone 907, as shown in FIG. 9, can, in some embodiments, be defined as closed and occupied within a perimeter defined by boundary points 907a-d. In some embodiments (not shown), the obstacle avoidance zone can further define a detour path at least partially surrounding the perimeter, the detour path extending outward from one or more edges of the perimeter. In such embodiments, the obstacle avoidance zone can include navigational rules forbidding robot navigation within the perimeter and requiring traverse around the perimeter along the detour path.

Referring now to FIG. 10, a zone property look-up Table 950, can be stored in the memory of each robot 18, the lookup table 950 including a listing of each zone 901, 903, 905, and 907 within a navigational space 900 such as warehouse 10. Each zone 901, 903, 905, and 907 is correlated in the table to the particular fiducial ID's 4-14 that are identified as the boundary points 901a-b, 903a-d, 905a, and 907a-d associated with that respective zone 901, 903, 905, and 907.

As described above, multiple properties and/or navigational regulations/constraints can be associated with defined zones, some of which can be compulsory and some of which can be optional. In general, whether compulsory or optional, zones should be defined so as to avoid applying mutually exclusive properties. For example, a zone cannot be both open and closed. Examples of compulsory properties assignable to all zones can include zone type, maximum occupancy, and maximum speed limit. Examples of optional zone properties can include traffic flow (e.g., one or two-way traffic, entry point and exit point), stop and wait, dynamic update, and expiration. In general, the type identifies the category or type of zone that is being defined (e.g. open, closed, nogo, aisle, queue, dock, or custom). Each type may include a particular set of default property settings, which may be fixed or may be partially or entirely editable by a user. Additionally, each type may include a different set of compulsory and/or optional properties.

Referring again to the zone property lookup table 950 of FIG. 10, the table 950 includes the properties Zone ID, the Boundary Point IDs, Open/Closed, Zone Type, Maximum Occupancy, Maximum Speed, Traffic Flow, Stop and Wait, Dynamic Update, and Expiration. As shown in FIG. 10, not all zone types include all properties. For example, only the one-way zone includes a value in the Traffic Flow property. These properties are described in greater detail below.

The open/closed property dictates whether a particular zone is navigable or closed to robot entry. Furthermore, when a zone is defined as closed, an additional "occupation" property must be set to indicate whether the zone is closed because of a physical barrier or is still navigable in principle. By differentiating between physical and virtual barriers, the system can provide appropriate instruction in the event of an emergency response. For example, a robot may be placed in or inadvertently navigate into a closed zone. In such scenarios, the robot 18 needs to be provided with instruction regarding whether to attempt to leave the zone so as to not be in violation of the nogo, or to stay put and avoid potential hazards. Such a determination can be made with reference to the occupation property such that the robot can leave an unoccupied closed zone as quickly and efficiently as possible whereas the robot can remain stationary within an occupied closed zone so as to avoid obstacles or hazards.

The maximum occupancy property dictates a maximum number of robots 18 or, alternatively, a maximum combined number of robots and humans that are permitted in the zone at any one time. In addition to collision and congestion reduction, zones having maximum occupancy limits can provide higher-level guidance for planning, such that route planning and/or optimization systems disfavor routing robots 18 through such zones in transit to another location. Thus the system can avoid clusters of transiting robots creating congestion within what would typically be a high usage zone (e.g., items are frequently picked within the zone).

The maximum speed property dictates a maximum permissible speed for robots 18 operating within a zone. Maximum robot operating speed can be limited, for example, in more sensitive zone types (queues or docks for example) or to reduce speed in areas that have greater foot traffic, tighter spaces, or are otherwise unsuitable for high speed operation. Alternatively, maximum speed can also be set very high to permit robots to make use of 'freeway' zones, where higher speeds can be achieved and maintained. In some embodiments, a freeway zone can be constructed as a separate zone type. However, it will be apparent in view of this disclosure that, in some embodiments, the freeway zone, rather than being a separate type, can instead be implied by a high maximum permissible speed. Such freeway zones are advantageous, for example, in larger sites where picks are spaced apart by a significant travel distance and where at last a portion of that distance can be traveled along straight, wide, aisles. Similarly, traveling from a picking task to an unloading queue, induction queue, or charging dock can require significant travel distance and may be expedited by use of freeway zones.

The traffic flow property can dictate a directionality of travel within a zone. Flow property, in some embodiments, can be established, as shown in the table of FIG. 10, by identifying a pair of edge ID lists associated with the zone. Generally, the first edge ID list can specify permissible 'entry edges' for the zone and the second edge ID list can specify permissible 'exit edges'. Once the desired entry edge and corresponding exit edge are selected by the robot 18, a direction vector can be determined by, for example, connecting the centers of both edges.

In some embodiments, flow can be determined by a direction property and an accompanying tolerance property value. The direction property can be represented as a target angle of a robot travel vector relative to the global orientation of the zone. The accompanying tolerance property value can indicate acceptable angular deviation from the target direction property. By combining the accompanying tolerance property value with the direction property, a range of acceptable in-zone travel angles can be determined. For example, for a direction property value of −90° having an accompanying tolerance property value of +/−5°, acceptable robot travel vectors within the zone can range between −85° to −95°.

The stop and wait property can dictate a stop and wait behavior by the robot at one or more edges of a particular zone before crossing the edge to enter or exit the zone. The stop property itself may, in some embodiments, include associated properties such as duration of stop, or a go condition that must be met before progress can resume. The stop property can be used, for example, at an intersection between a main aisle and a shelving aisle. In such embodiments, the robot 18 would be required to stop at the intersecting edge and perform a scan to verify that there is no oncoming robot or human traffic within a prescribed proximity to the robot. If the scan is clear, then the robot 18 can proceed, if the scan detects oncoming traffic, the robot must wait a prescribed period of time and then rescan, repeating until the intersection is clear.

The dynamic update property identifies whether the current location, size, and shape of the zone is consistent with the original user-defined zone or if the zone has been dynamically updated by the system. For example, if one or more of the fiducial marker boundary points associated with a zone were moved to a new physical location within the warehouse, that new location would be detected during SLAM map updates, thus automatically updating the location of the fiducial marker boundary point and resulting in a corresponding update to the size, shape, and location of the zone. Thus, the dynamic update property tracks whether or not the user-defined zone has been updated so that the user can be notified of or query such changes.

The expiration property dictates a time remaining until this zone is automatically removed or reconfigured by the zone server. For example, an aisle that is blocked for scheduled maintenance may be expected to be blocked only for a prescribed period of time until the scheduled maintenance is complete. In such embodiments the maintenance zone can be temporarily defined as a closed zone and, after the designated time period expires, the zone can be reopened. The prescribed time may, in some embodiments, be based on other system knowledge/events such as a maintenance schedule stored in a warehouse management system. In another example, an area that is slippery due to a spill may be anticipated to be cleaned up within a prescribed number of hours. In some embodiments, the expiration property can be dynamically updated or reset in response to data provided, for example, by one or more robots 18, a warehouse management system, a user, or other data sources (e.g., a robot indicating that the spill has not yet been cleaned up).

It will be apparent in view of this disclosure that, in some embodiments, additional properties can be added to describe any additional constraints and/or regulations associated with a particular zone. It will further be apparent in view of this disclosure that any property can be dynamically updated in response to data provided by one or more robots 18, a warehouse management system, a user, or other data sources such as, for example, the internet, a supplier database, a customer database, or any other suitable data source. For example, in some embodiments, closed zones can be occupied by shelving containing pickable stock items. Such zones can include properties for tracking data connected to the stock itself, where such data is expected to affect robot behavior. For example, whether a stock item is fast-moving or slow-moving (high or low demand) may impact the adjacent open zones used by the robots to access the items. Thus, if the average stock in a particular zone is fast-moving the maximum occupancy of the zone may be automatically increased to provide higher robot throughput. As a consequence of the increased robot and human picker traffic, the open zone can also be updated to become a one-way zone to reduce collision and congestion risk.

To the extent that any zones are related as parent zone and sub-zone, such as, for example, where a picking zone encompassing multiple shelves and aisles is subdivided into multiple open (aisle) and closed (shelving) zones, a parent reference property can be included to capture each zone's relationship to any sub-zones contained within it or parent zones to which it belongs.

In some embodiments, where one or more zones intersect, there may not an easily identifiable parent-child relationship. Nevertheless, the intersecting 'overlap' of properties must be resolved for the intersection to have valid, non-conflicting rules. Such circumstances most often come into play when zones of the same type are overlapping or adjacent. However, intersection/overlap can generally occur between two or more types or where zones having special localized versions of global properties. The zone engine system, can therefore be configured to produce a single, valid set of properties for the intersection area, regardless of type and regardless of whether the intersection is designated as a separate zone or not.

Figure 11:
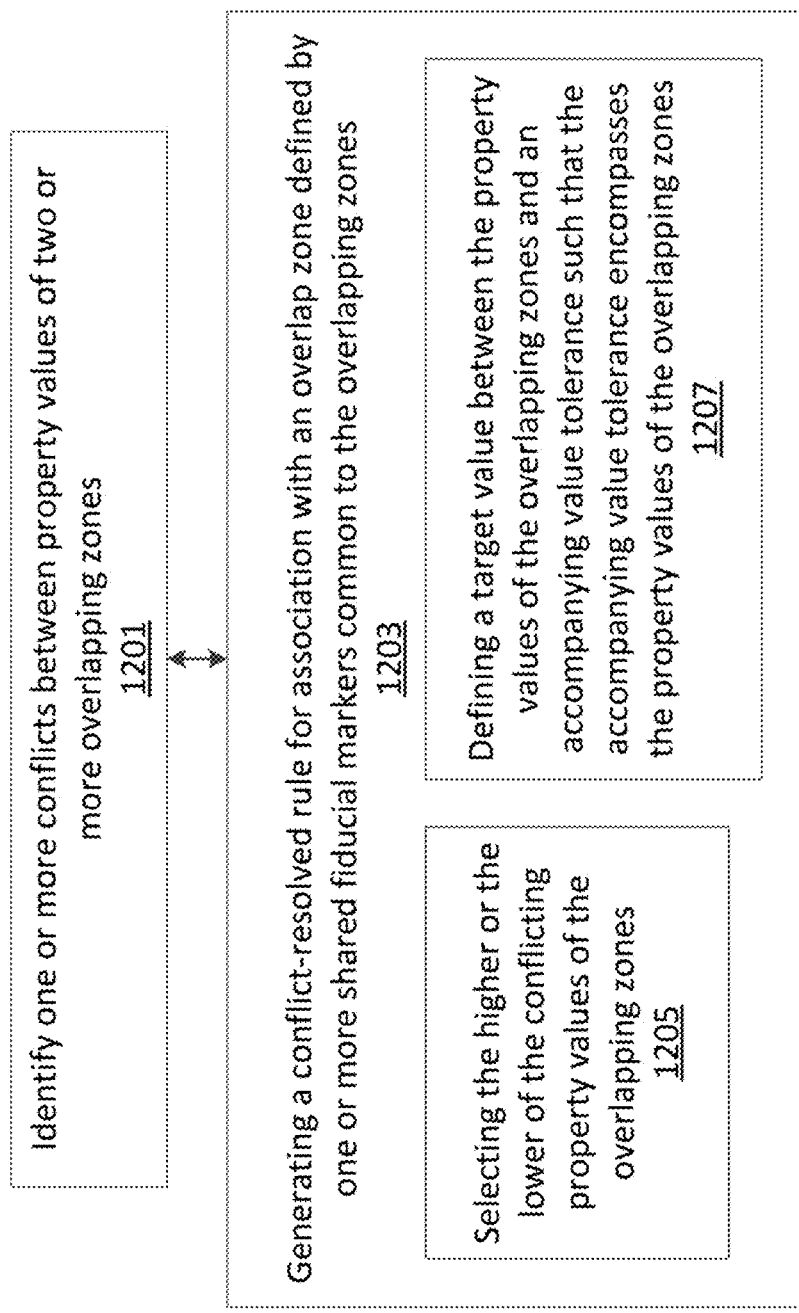
FIG. 11 is a flow chart depicting a method for conflict resolution between overlapping zones.

In some embodiments, determining the intersection properties can include a two-step process as described in the flow chart of FIG. 11. First, the zone engine system can identify 1201 one or more conflicts between the property values of two or more overlapping zones. Initially, the system can aggregate the overlapping zone properties. During the aggregation, relevant properties associated with each overlapping zone can be compared and filtered. For example, in some embodiments, any boundary points identified as unique to only one of the overlapping zones, or positioned more than a predetermined distance from the intersection, can be ignored as irrelevant. In some embodiments, any properties identified as unique to only one of the overlapping zones can be either kept as properties of the intersection area to the extent that they are not mutually exclusive or conflicting with other such properties or can be discarded en masse as inapplicable. Alternatively, only selected unique properties can be kept according to one or more predefined rules. Any properties identified as identical and applicable to all of the overlapping zones in the intersection area can be kept as applicable within the intersection area to the extent that they are not mutually exclusive or conflicting with other such properties. Where at least two of the overlapping zones include a different or conflicting value for the same property or properties, those values can be identified 1201 and further processed for the second step of conflict resolution.

Still referring to FIG. 11, conflict resolution can be used to evaluate and then generate 1203 a conflict-resolved single value for properties wherein the overlapping zones are assigned different values. Generally, the single value should be compatible with the original zone values. Such properties can include, for example, speed limits and occupancy limits, which are typically assigned for each zone specifically and likely to have intersecting, differing definitions. Such properties can also include directionality of travel, in particular where one-way zones, two-way zones, and/or nogo zones intersect.

With respect to quantity values such as for speed limits or occupancy limits, conflict resolution can typically be achieved by way of a 'catch-all' approach. Referring again to FIG. 11 One such approach can include selecting 1205 the highest or lowest of the conflicting property values of the overlapping zones. For example, a conservative strategy can apply the lowest value property to the intersection area (e.g., the lowest maximum speed or lowest maximum occupancy). The conservative approach is likely to reduce the risk of accidents/collisions between robots but will also likely slow down picking and reduce picking efficiency. Alternatively, a less conservative approach can default to the highest property values to the zone (so long as the values provided don't create inherently dangerous conditions), which may slightly increase the risk of accidents/collisions between robots but permits faster, more efficient picking.

With respect to more complex conflict resolution, such as directionality values, tolerances in the property values can aid in successful resolution. In particular, tolerances, by providing a range of acceptable property values, can permit partial overlap between conflicting property value ranges where the conflict would otherwise be unresolvable. Thus, as in FIG. 11, the conflict resolution can be achieved by defining 1207 a target value between the property values of the overlapping zones and an accompanying value tolerance such that the accompanying value tolerance encompasses the property values of the overlapping zones. For example, in the case of intersecting one-way zones, to the extent that there is no overlap of directionality value ranges (e.g., where one-way zones having opposite traffic flow directionality share an exit edge), no resolution is possible. For such unresolvable conflicts, the conflict must be identified by the zone engine and can either be automatically resolved by amending the properties of one or more of the overlapping zones or by alerting a user of a need to reconfigure the zone map.

For other zones, such tolerances can be configured to permit traverse of the robot from one zone to the next. For example, in an embodiment having two intersecting one-way zones, one with a direction property value of 90° (east) and another with a direction property value 1350 (southeast). Absent a tolerance range, these directional values are incompatible. However, in order to promote maximum navigational flexibility by the robot within each zone, tolerance values can be set as high as is safely reasonable. Thus, in a one-way zone, a maximum tolerance value associated with continuously moving the robot in the "correct" direction can be used. To that end, such a tolerance value can be set to +/−89° relative to the target directional property value. Referring to the example, described above, such a tolerance would permit, for the first zone having the direction property value of 90°, a range of directional motion between 1° to 179° and, for the second zone having the direction property value of 135°, a range of directional motion between 46° to 224°. The overlap between these ranges is 46° to 179°, which can be assigned to the intersection area as the resolved properties of direction property value=112.5° and tolerance value=+/−66.5°.

In embodiments where direction-limited zones are defined using entry and exit edges the conflict resolution for shared edges or shared edge portions of those intersecting zones will be performed as part of the zone engine processing of the zone definition. For example, if edge definitions for the intersecting zones cause blocking effects (e.g., an entry-edge for a one-way sub-zone is located in the middle of an aisle and is in conflict with an exit-edge defined in the same aisle by a parent zone (or vice versa). In such cases the zone engine will attempt to resolve on the edge properties that are not in conflict if such edge properties exist. To the extent that no solution is available, the user will be notified that the zone map needs to be reconfigured.

In some embodiments, even zones that neither intersect nor have a parent-child relationship may impact one another in a manner requiring property modification of related zones. Such relationships are typically defined by the zone proximity and the presence of properties that are influenced by that proximal nature. In some embodiments, such relationships can occur where the properties of 'closed' (e.g., no-go) zones impact the properties of adjacent "open" zones. For example, if an aisle is designated as an unoccupied, closed zone, the zone engine can modify (either automatically or in response to user instruction) the maximum occupancy of the "open" aisle or aisles adjacent to the nogo aisle to accommodate additional robots traversing around the nogo zone. Furthermore, to the extent that product is still being picked from the nogo zone, the maximum occupancy of the adjacent "open" aisle or aisles can be increased to accommodate robot queuing proximate the no-go zone.

Similarly, if a shelving structure or other item stocking location is designated as an occupied, closed zone, and the zone engine determines, either automatically through pick-list analysis or via user input, that one or more items stored on that shelving structure/stocking location will be in high demand (e.g., where a free gift to be given away with each purchase is stored or where a trendy new product with expected high initial sales is stored), the zone engine can modify (either automatically or in response to user instruction) the maximum occupancy of the "open" aisle or aisles adjacent to the shelving structure/stocking location to accommodate additional robots traversing around and queuing proximate the occupied, closed zone.

It will be apparent in view of this disclosure that the example zones are described above for illustration purposes only and that any other zone of any size and shape, defined by any number of fiducial markers, and having any number or type of properties, navigational regulations, relationships to other zones, or constraints can be implemented in accordance with various embodiments.

Non-Limiting Example Computing Devices

Figure 12:
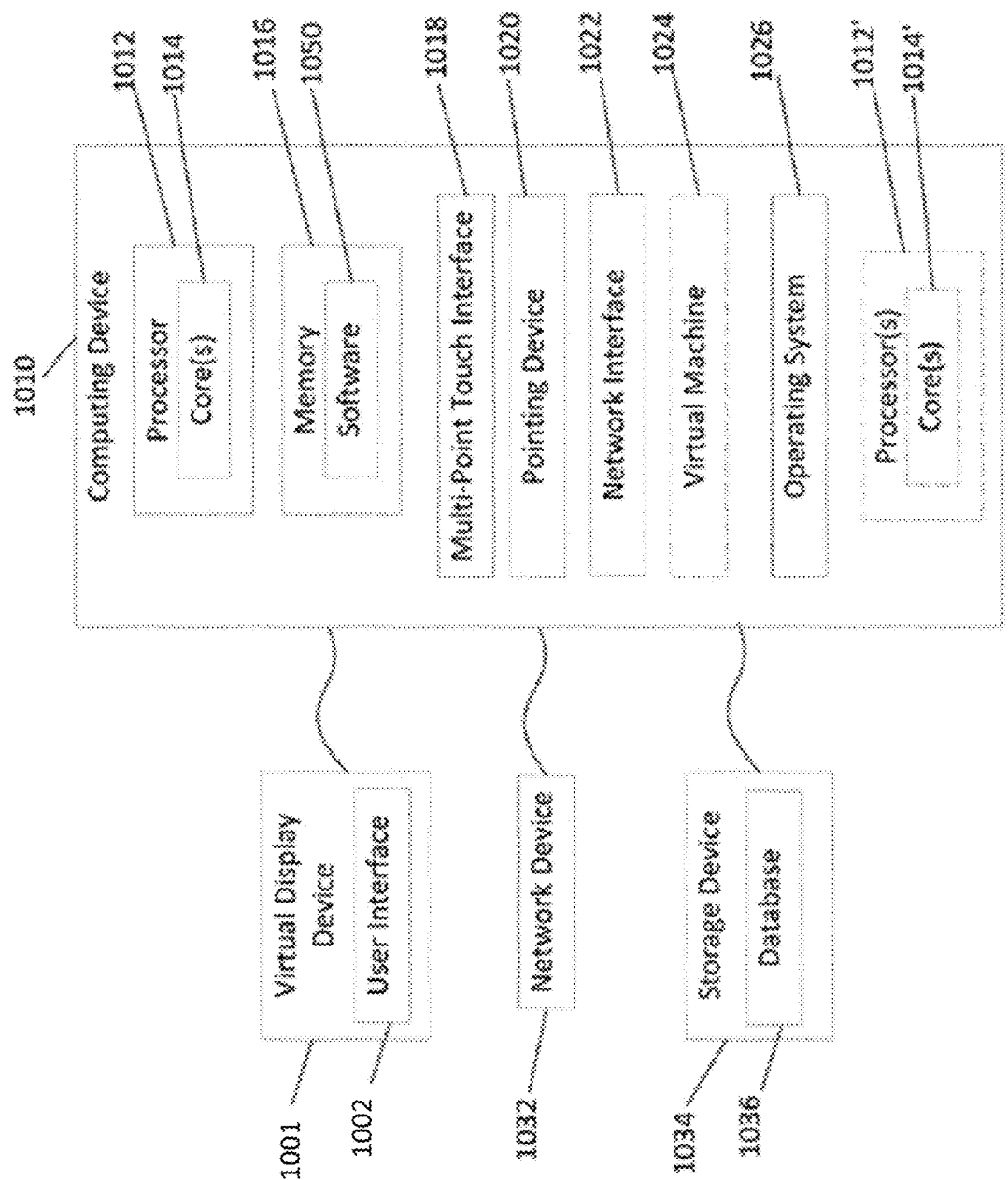
FIG. 12 is a block diagram of an exemplary computing system.

FIG. 12 is a block diagram of an exemplary computing device 1010 such as can be used, or portions thereof, in accordance with various embodiments as described above with reference to FIGS. 1-11. The computing device 1010 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1016 included in the computing device 1010 can store computer-readable and computer-executable instructions or software for performing the operations disclosed herein. For example, the memory can store software application 1040 which is programmed to perform various of the disclosed operations as discussed with respect to FIGS. 1-11. The computing device 1010 can also include configurable and/or programmable processor 1012 and associated core 1014, and optionally, one or more additional configurable and/or programmable processing devices, e.g., processor(s) 1012' and associated core (s) 1014' (for example, in the case of computational devices having multiple processors/cores), for executing computer-readable and computer-executable instructions or software stored in the memory 1016 and other programs for controlling system hardware. Processor 1012 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1016 can include a computational device memory or random access memory, such as but not limited to DRAM, SRAM, EDO RAM, and the like. Memory 1016 can include other types of memory as well, or combinations thereof.

A user can interact with the computing device 1010 through a visual display device 1001, 111A-D, such as a computer monitor, which can display one or more user interfaces 1002 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1001. The computing device 1010 can include other suitable conventional I/O peripherals.

The computing device 1010 can also include one or more storage devices 1034, such as but not limited to a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 13:
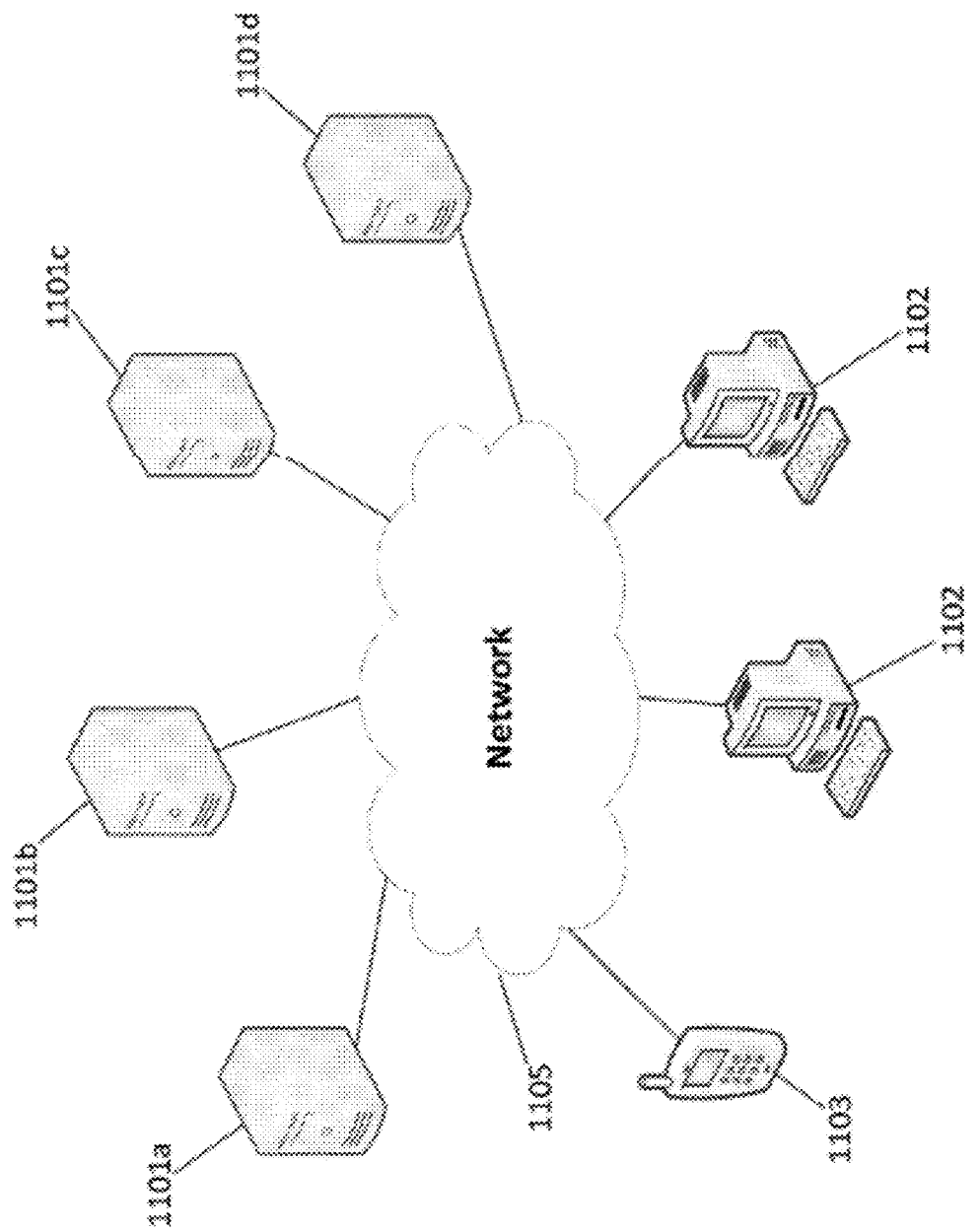
FIG. 13 is a network diagram of an exemplary distributed network.

FIG. 13 is an example computational device block diagram of certain distributed embodiments. Although FIGS. 1-11, and portions of the exemplary discussion above, make reference to a warehouse management system 15, an order-server 14, and a zone server each operating on an individual or common computing device, one will recognize that any one of the warehouse management system 15, the order-server 14, an/or the zone server may instead be distributed across a network 1105 in separate server systems 1101a-d and possibly in user systems, such as kiosk, desktop computer device 1102, or mobile computer device 1103. For example, the order-server 14 and/or the zone server may be distributed amongst the tablets 48 of the robots 18. In some distributed systems, modules of any one or more of the warehouse management system software, the order-server software, and the zone engine can be separately located on server systems 1101a-d and can be in communication with one another across the network 1105.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by Letters Patent is:

1. A method for contextually mapping zones within a space for regulating robotic navigation within the space, comprising:
    defining, by a plurality of fiducial markers positioned within the space, a zone within the space;
    associating a rule with the zone, the rule at least partially dictating operation of one or more robots within the zone;
    operating the one or more robots within the zone consistent with the rule;
    wherein each of the plurality of fiducial markers within the space is correlated with a pose having a relative position to the fiducial marker, the relative position represented by a set of coordinates of a coordinate system defined by the space; and wherein a boundary of the zone intersects the pose associated with each fiducial marker; and
    in response to a detected repositioning and/or reorientation of at least one fiducial marker of the plurality of fiducial markers, automatically updating the pose associated with the repositioned and/or reorientated at least one fiducial marker and automatically redefining the boundary of the zone within the space based on the updated pose, such that the boundary intersects with the updated pose of the repositioned and/or reorientated at least one fiducial marker.

2. The method of claim 1, wherein the rule dictates at least one of whether the zone is open or closed, a type of the zone, a maximum occupancy of the zone, a maximum speed of the zone, a traffic flow directionality of the zone, a stop and wait behavior when entering or exiting the zone, whether a definition of the zone has been dynamically updated, an expiration of the zone, or combinations thereof.

3. The method of claim 1, wherein the step of associating further comprises generating a lookup table correlating the zone with the plurality of fiducial markers and the rule.

4. The method of claim 1, further comprising:
    associating one or more additional rules with the zone, the additional rules at least partially dictating operation of one or more robots within the zone; and
    operating the one or more robots within the zone consistent with the additional rules.

5. The method of claim 4, wherein the additional rules dictate at least one of whether the zone is open or closed, a type of the zone, a maximum occupancy of the zone, a maximum speed of the zone, a traffic flow directionality of the zone, a stop and wait behavior when entering or existing the zone, whether a definition of the zone has been dynamically updated, an expiration of the zone, or combinations thereof.

6. The method of claim 4, wherein the step of associating one or more additional rules further comprises generating a lookup table correlating the zone with the plurality of fiducial markers, the rule, and the additional rules.

7. The method of claim 1, further comprising:
    detecting at least one of overlap or adjacency of the zone with respect to a second zone; identifying a conflict between a value of the rule and a corresponding value of a corresponding rule of the second zone;
    generating a conflict-resolved rule for association with an overlap zone defined by one or more shared fiducial markers common to the zone and the second zone.

8. The method of claim 7, wherein the step of generating the conflict-resolved rule further comprises selecting the higher or the lower of the value and the corresponding value.

9. The method of claim 7, wherein the step of generating the conflict-resolved rule further comprises:
    defining a target value between the value and the corresponding value; and
    associating the target value with an accompanying value tolerance such that the accompanying value tolerance encompasses both the value and the corresponding value.

10. The method of claim 1, further comprising at least one of automatically modifying the rule or automatically adding an additional rule in response to data received from one or more of the robots, a warehouse management system, a user, or an external data source.

11. The method of claim 1, wherein the step of operating further comprises:
    periodically reporting, from the one or more robots to a central controller, a position of the one or more robots within the space; and
    instructing, by the central controller, in response to reported positioning of the one or more robots within the zone, the one or more robots to operate as dictated by the rule.

12. The method of claim 1, wherein the position of the one or more robots within the space is not determined by reading the at least one fiducial marker.

13. The method of claim 1, wherein the step of operating further comprises:
    periodically detecting, by each respective one of the one or more robots, a position of the robot within the space; and
    operating, in response to detecting positioning of the robot within the zone, the robot as dictated by the rule.

14. The method of claim 13, wherein the position of the one or more robots within the space is not determined by reading any of the plurality of fiducial markers.

15. A system for contextually mapping zones within a space for regulating robotic navigation within the space comprising:
    a processor; and
    a memory storing instructions that, when executed by the processor, cause the system to:
    define, by a plurality of fiducial markers positioned within the space, a zone within the space;
    associate a rule with the zone, the rule at least partially dictating operation of one or more robots within the zone;
    operate the one or more robots within the zone consistent with the rule;
    wherein each of the plurality of fiducial markers within the space is correlated with a pose having a relative position to the fiducial marker, the relative position represented by a set of coordinates of a coordinate system defined by the space; and wherein a boundary of the zone intersects the pose associated with each fiducial marker; and in response to a detected repositioning and/or reorientation of at least one fiducial marker of the plurality of fiducial markers, automatically updating the pose associated with the repositioned and/or reorientated at least one fiducial marker and automatically redefining the boundary of the zone within the space based on the updated pose, such that the boundary intersects with the updated pose of the repositioned and/or reorientated at least one fiducial marker.

16. The system of claim 15, the memory further storing instructions that, when executed by the processor, cause the system to:
generate, in the memory, a lookup table correlating the zone with the plurality of fiducial markers and the rule.

17. The system of claim 15, the memory further storing instructions that, when executed by the processor, cause the system to:
associate one or more additional rules with the zone, the additional rules at least partially dictating operation of one or more robots within the zone; and
operate the one or more robots within the zone consistent with the additional rules.

18. The system of claim 15, the memory further storing instructions that, when executed by the processor, cause the system to:
generate, in the memory, a lookup table correlating the zone with the plurality of fiducial markers, the rule, and the additional rules.

19. The system of claim 15, the memory further storing instructions that, when executed by the processor, cause the system to:
at least one of automatically modify the rule or automatically add an additional rule in response to data received from one or more of the robots, a warehouse management system, a user, or an external data source.

20. The system of claim 15, wherein a position of the one or more robots within the space is not determined by reading any of the plurality of fiducial markers.

* * * * *